Figure 1:
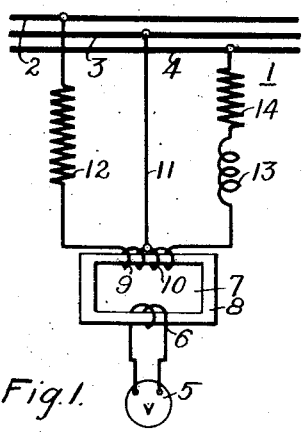

April 28, 1925.

R. D. EVANS 1,535,587

ELECTRICAL MEASURING INSTRUMENT

Filed Feb. 13, 1920   2 Sheets-Sheet 1

WITNESSES:
J. A. Helsel
J. M. Procter

INVENTOR
Robert D. Evans.
BY
Wesley G. Carr
ATTORNEY

April 28, 1925.  1,535,587
R. D. EVANS
ELECTRICAL MEASURING INSTRUMENT
Filed Feb. 13, 1920   2 Sheets-Sheet 2

WITNESSES:

INVENTOR
Robert D. Evans.
BY
Wesley G. Carr
ATTORNEY

Patented Apr. 28, 1925.

1,535,587

UNITED STATES PATENT OFFICE.

ROBERT D. EVANS, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed February 13, 1920. Serial No. 358,440.

*To all whom it may concern:*

Be it known that I, ROBERT D. EVANS, a citizen of the United States, and a resident of Pittsburgh, in the county of Allegheny and State of Pennsylvania, have invented a new and useful Improvement in Electrical Measuring Instruments, of which the following is a specification.

My invention relates to measuring systems and particularly to means for measuring the symmetrical components of unbalanced polyphase quantities.

One object of my invention is to provide a static system whereby ordinary measuring instruments may be employed to indicate the symmetrical components of the unbalanced quantities of an electrical system.

Another object of my invention is to provide a device of the above mentioned character that shall indicate a factor which may be employed in the determination of the charges for electrical energy.

A further object of my invention is to provide a device of the above indicated character that shall be simple and inexpensive to construct and that shall be effective and accurate in its operation.

Copending application, Serial No. 358,373, filed Feb. 13, 1920, by C. LeG. Fortescue, L. W. Chubb and J. Slepian, discloses the broad principle of measuring the symmetrical components of the unbalanced quantities of a system, and also sets forth the fact that some means must be employed to indicate the charge to be imposed on a customer for consuming his load as single-phase because it is a well known fact that when a polyphase circuit is unbalanced the capacity of the generator and the feeder conductors is reduced.

It may be pointed out that power-factor meters and reactive volt-ampere meters which indicate correctly on a balanced system indicate incorrectly on an unbalanced system. It may also be pointed out that any unbalanced polyphase system of electrical quantities may be resolved into two or more balanced or symmetrical systems which, in a three-phase three conductor system, may be termed the zero, the positive and the counter or negative rotational components. That is, the voltage, current or any other electrical quantity in a three-phase unbalanced circuit may be resolved into a zero phase-sequence component, a positive phase-sequence component and a negative phase-sequence component. The zero phase-sequence component is zero under usual conditions in a three-phase three-conductor circuit. The ratio of the negative and the positive symmetrical phase-sequence quantities is a measure of the unbalance of the quantities of a system and may be used to charge for energy consumed.

In practicing my invention, I employ the broad principles set forth in the above mentioned application, but I do not require the use of rotating apparatus and I employ also ordinary measuring instruments. This is accomplished by the use of a transformer and resistors and reactors or impedance devices connected between the standard instrument and the circuit. The instrument will indicate either the positive or the negative phase-sequence component, depending upon the connection of the transformers to the circuit.

By employing resistors and reactors having proper relative reactances and impedances, I am able to segregate the several symmetrical components into which an unbalanced polyphase quantity may be resolved and may then measure any one of such components alone or may combine them to obtain any desirable quantities or products of quantities.

The positive and the negative phase-sequence components into which an unbalanced polyphase quantity may be resolved comprise a plurality of single or vector elements that are displaced by an angle that is equivalent to $\frac{360°}{N}$ where N is the number of phases. In a three-phase circuit, the different elements of a symmetrical component are spaced 120° apart. The zero phase-sequence component, however, consists merely of quantities that are in phase and are not angularly displaced, as are the several elements of the positive and the negative phase-sequence components.

Figure 2:
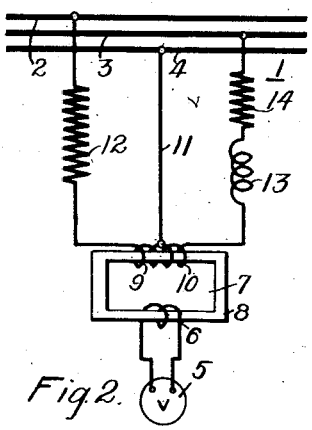
Figure 3:
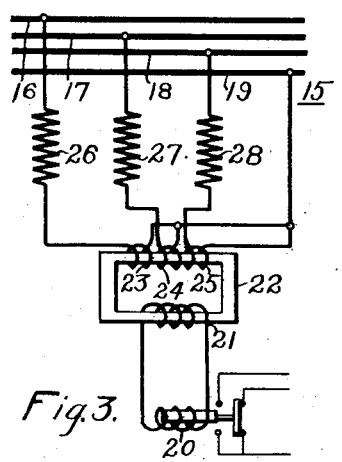
Figure 4:
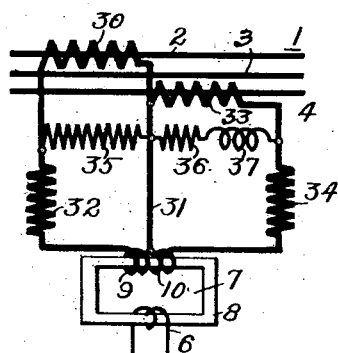
Figure 5:
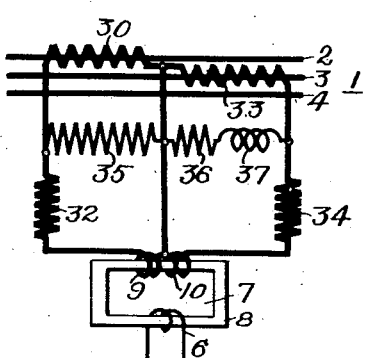
Figure 6:
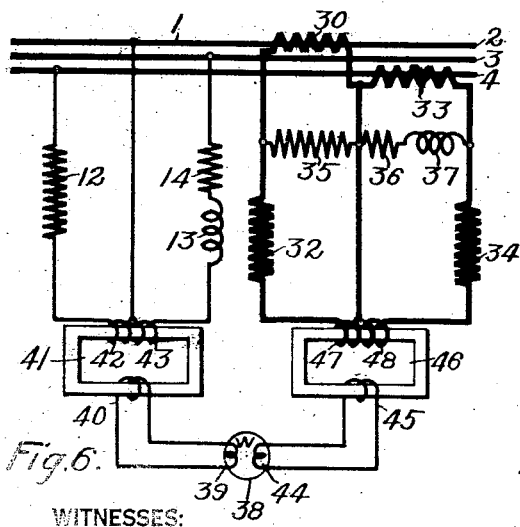
Figure 7:
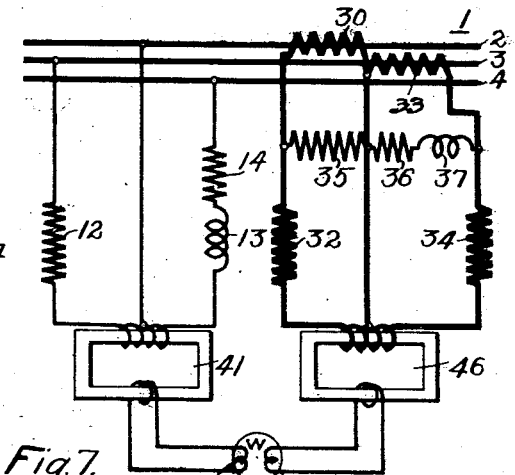
Figure 8:
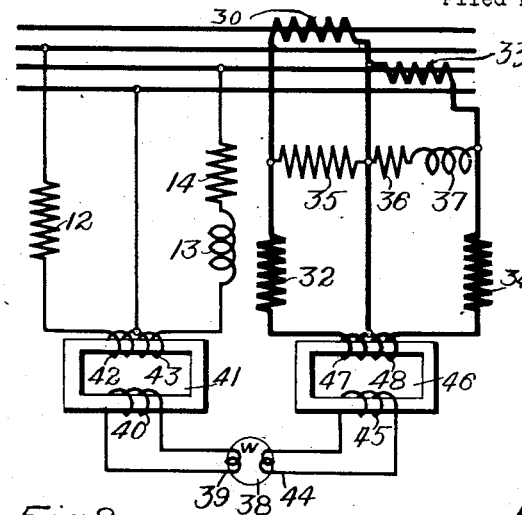
Figure 9:
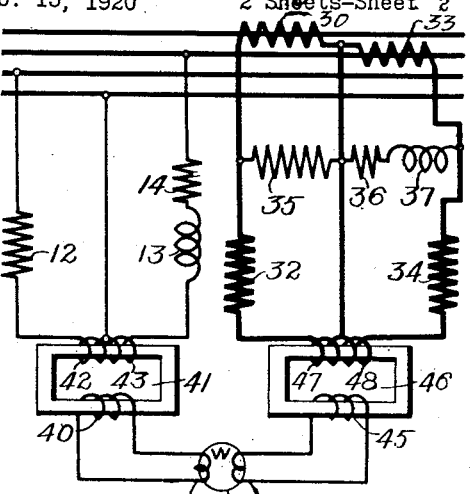
Figure 10:
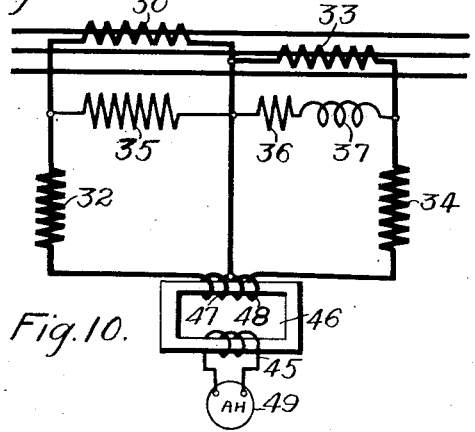
Figure 11:
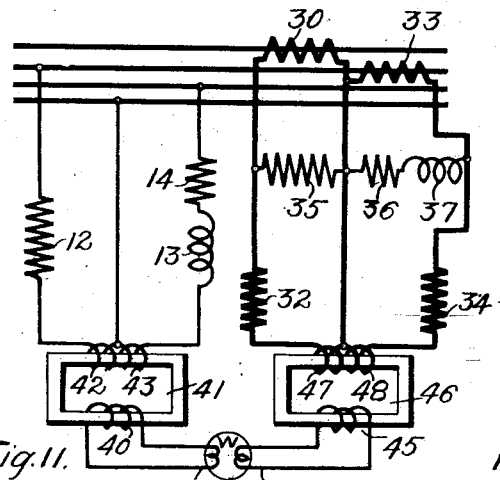
Figure 12:
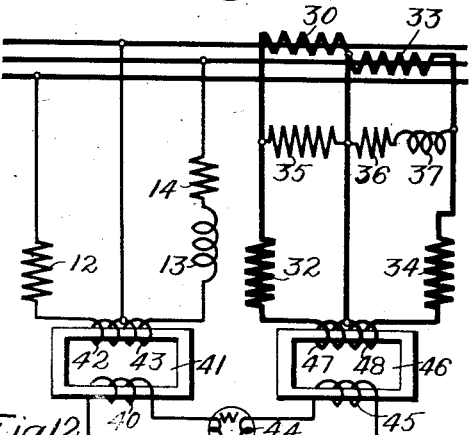

Figures 1 and 2 of the drawings are diagrammatic views of a measuring device for indicating the direct and counter-rotational voltage components, respectively, of an electrical circuit. Fig. 3 is a diagrammatic view of a relay device actuated in accordance with one symmetrical voltage component of the circuit. Figs. 4 and 5 are diagrammatic views of a measuring device for indicating the direct and counter-rotational current components, respectively, of an electrical circuit. Figs. 6 and 7 are diagrammatic views of a measuring instrument for indicating the direct and the counter-rotational components, respectively, of the reactive power of an electrical circuit. Figs. 8 and 9 are diagrammatic views of an electrical measuring device for indicating direct and counter-rotational components, respectively, of the power traversing an electrical circuit. Fig. 10 is a diagrammatic view of an instrument for indicating the symmetrical components of the ampere hours traversing the circuit. Fig. 11 is a diagrammatic view of a measuring instrument for measuring the product of the direct rotational voltage, the counter-rotational current and the co-sine of the angle therebetween, as in a wattmeter, and Fig. 12 is a diagrammatic view of a measuring instrument for measuring the product of the direct rotational voltage, the counter-rotational current and the sine of the angle therebetween as in a reactive-component meter.

A polyphase circuit 1 comprises conductors 2, 3 and 4 upon which is impressed an unbalanced voltage or upon which the load is so unbalanced as to cause the voltage thereon to be unbalanced. An ordinary voltmeter 5 is connected to the secondary winding 6 of a transformer 7 having a core member 8 and two primary windings 9 and 10. The common terminal of the windings 9 and 10 is connected, through a conductor 11, to the conductor 3. The one terminal of the winding 9 is connected, through a resistor 12, to the conductor 2, and the other terminal of the winding 10 is connected, through a reactor 13 and a resistor 14, to the conductor 4. The resistor 12 is of such high resistance that the current traversing the winding 9 is in phase with the voltage across the conductors 2 and 3. The impedance of the reactor 13 and the resistor 14 is of such value that the current traversing the winding 10 lags 60° behind the voltage across the conductors 3 and 4. The windings 9 and 10 are connected in opposition to each other.

With the arrangement shown in Fig. 1 of the drawings, magnetic flux is induced in the core member 8 of the transformer 7 to thereby cause current to traverse the instrument 5 when a balanced polyphase voltage of predetermined phase sequence exists on the circuit. Also, the resistor 12 and the impedance of the circuit, comprising the resistor 14 and the reactor 13, is such that no magnetic flux interlinks with the circuit when a balanced polyphase voltage of the other phase sequence is applied to the circuit. It will be seen that, with the connections shown in Fig. 1, the resulting flux interlinking the winding 6 and, consequently, the currents traversing the instrument 5 are proportional to the direct rotational component of the unbalanced voltage impressed on the circuit 1. If the conductor 11 and the circuit comprising the resistor 14 and the reactor 13 are reversed in their connection to the circuit 1, as shown in Fig. 2, the voltmeter 5 will be supplied with current which is proportional to the counter-rotational component of the unbalanced voltage impressed on the circuit 1.

In Fig. 3 of the drawings, a circuit 15 comprises four conductors 16, 17, 18 and 19, the conductor 19 of which is a neutral conductor. An electro-responsive device 20, such as a relay, is connected to the secondary winding 21 of a transformer 22 having three primary windings 23, 24 and 25, one terminal of each of the windings 23, 24 and 25 being connected to the neutral conductor 19 and the other terminals of the windings 23, 24 and 25 being connected, through the equal resistors 26, 27 and 28, to the respective conductors 16, 17 and 18. With this arrangement, the device 20 will be operated when the sum of the voltage drops across the various phases is not zero. That is, it indicates the zero phase-sequence component. In other words, whenever a fault obtains on the device (not shown) that is to be protected, voltage will be induced in the winding 21 to effect the operation of the relay 20.

In Figs. 4 and 5, the three-phase circuit 1 is operatively connected, through the transformer 7, to an ammeter 29. A series transformer 30 is connected, through a conductor 31, to the common terminals of the windings 9 and 10 and, through a resistor 32, to the other terminals of the winding 9. Similarly, a series transformer 33 is connected, through the conductor 31, to the common terminals of the windings 9 and 10 and, through a resistor 34, to the other terminal of the winding 10. A resistor 35 is connected across the terminals of the transformer 30, and a resistor 36 and a reactor 37 are connected, in series, across the terminals of the transformer 33. With the arrangement shown in Figs. 4 and 5, the resistor 35 has a voltage impressed thereacross which is proportional to the current traversing the conductor 2 of the circuit 1, and the resistor 36 and reactor 37 have a voltage impressed thereacross which is proportional to the current traversing the conductor 4 in Fig. 4 and the conductor 3 in Fig. 5. Thus, as set forth with respect to Figs. 1 and 2 of the drawings, the current traversing the winding 9 of Fig. 4 will be in phase with the voltage across the resistor 35. Similarly, the current traversing the winding 10 will be 60° out of phase with the voltage across the resistor 36 and the reactor 37. Thus, the meter 29 will indicate, when connected as shown in Fig. 4, the direct rotational component of the current traversing the circuit 1 and, when connected as shown in Fig. 5, the counter-rotational component of the current traversing the circuit 1.

In Fig. 6 of the drawings, the circuit 1 is provided with a wattmeter 38 which is supplied with two currents, one of which is proportional to the direct rotational voltage and the other of which is proportional to the direct rotational current to thus cause the meter 38 to indicate the direct rotational reactive power traversing the circuit 1. The voltage winding 39 of the meter 28 is connected to the secondary winding 40 of a transformer 41, the two primary windings 42 and 43 of which are connected in opposition to each other and, through a resistor 12 and a resistor 14 and a reactor 13, to the circuit 1. The current winding 44 of a meter 38 is connected to the secondary winding 45 of a transformer 46, the primary windings 47 and 48 of which are connected, through resistors 32 and 34, to the current transformers 30 and 33, similar to the connections shown in Figs. 4 and 5 of the drawings. With this arrangement, the winding 39 will be supplied with current in accordance with the direct rotational component of the voltage impressed on the circuit 1. The winding 44 will be provided with current proportion to the direct rotational component of the current traversing the circuit but with such phase relation that the meter 38 will indicate the product of these two quantities and the sine of the angle therebetween and, since they are taken in such direction as to obtain the reactive component of the product, or the direct rotational component of the reactive power traversing the circuit 1.

In Fig. 7 of the drawings, the meter 38 is connected, through the transformers 41 and 46, to the circuit 1 substantially as shown in Fig. 6, with the exception that the transformer 33 is connected to the conductor 3 instead of to the conductor 4, and the terminals of the resistors 12 and 13 are interchanged. With this arrangement, the winding 39 is provided with current proportional to the counter-rotational component of the voltage and the winding 44 with current proportional to the counter-rotational current traversing the circuit, and the instrument 38 will, consequently, indicate in accordance with the counter-rotational component of the reactive power traversing the circuit 1.

In Figs. 8 and 9 of the drawings, the windings 39 and 44 of the meter 38 are supplied with two currents proportional to the direct-rotational voltage and the direct-rotational current, in one instance, and to the counter-rotational voltage and counter-rotational current, in the other instance, thus indicating the direct-rotational power when connected as shown in Fig. 8 and the counter-rotational power when connected as shown in Fig. 9.

In Fig. 10 of the drawings, an ampere-hour meter 49 is connected to the secondary winding 45 of the transformer 46, the primary windings 47 and 48 of which are connected in series with the transformers 30 and 33 that are associated with the circuit 1, substantially as shown in Fig. 5 of the drawings.

With this arrangement, the meter 49 is supplied with current proportional to the counter-rotational component of the current traversing the circuit 1 and, since the meter 49 is a motor meter, it will indicate the counter-rotational ampere hours which constitute a measure of the ampere-hour unbalance of the circuit.

In Fig. 11, the windings of the meter 38 are provided with currents proportional to the direct-rotational voltage and counter-rotational current and are so combined that the meter 38 measures a factor which is the product of direct-rotational voltage, counter-rotational current and the co-sine of the angle therebetween, similar to the indication of a wattmeter.

In Fig. 12 of the drawings, the windings 39 and 44 of the meter 38 are supplied with currents proportional to the direct-rotational voltage and the counter-rotational current and they are combined to produce an indication of the meter 38 proportional to the product of these values and the sine of the angle therebetween, in the manner of a reactive-component meter.

The operation of the various arrangements for obtaining the power reactive component and ampere-hour factors are similar to the operation of the device shown and described with respect to Fig. 1 of the drawings. It will be understood, however, that the windings are so connected to the circuit as to obtain the proper phase relationship between the voltage and the current in order that the direct or counter-rotational component may be obtained and, also, the phase relationship between the current and the voltage is such as to obtain power or reactive components, as desired.

My invention provides means for determining several factors which are valuable in determining the proper charge to be made for energy and for computing various electrical quantities by resolving the quantities into a plurality of balanced systems. Many changes may be made in my invention without departing from the spirit and scope of the same, as set forth in the appended claims.

I claim as my invention:

1. In an N-polyphase circuit, the combination with an electro-responsive device and a transformer, of static means including said transformer connected between the device and the circuit to cause the device to be energized from the circuit in accordance with one symmetrical component of a polyphase electrical quantity, which component comprises a plurality of single phase vector quantities angularly displaced by $\frac{360}{N}$ degrees.

2. In an N-polyphase circuit, the combination with an electro-responsive device, of stationary means connected between the device and the circuit to cause the device to be actuated in accordance with the value of a symmetrical component of a polyphase electrical quantity, which component comprises a plurality of vector quantities angularly displaced by $\frac{360}{N}$ degrees.

3. In an N-polyphase circuit, the combination with an electro-responsive device, of stationary electrical means connected between the device and the circuit to cause the device to be actuated in accordance with a phase-sequence component of a polyphase electrical quantity, which component comprises a plurality of vector quantities angularly displaced by $\frac{360}{N}$ degrees.

4. In an N-polyphase circuit, the combination with an electro-responsive device, of a plurality of impedances connected between the device and the circuit to cause the device to be energized in accordance with a phase-sequence component of a polyphase electrical quantity, which component comprises a plurality of vector quantities angularly displaced by $\frac{360}{N}$ degrees.

5. In an N-polyphase circuit, the combination with a standard alternating-current measuring instrument, of stationary means connected between the instrument and the circuit to cause the instrument to indicate a quantity which is one of a set of symmetrical quantities, into which the unbalanced currents of the circuit may be resolved, in which set the quantities are angularly displaced by $\frac{360}{N}$ degrees.

6. A measuring device for a polyphase circuit comprising an indicating instrument, a plurality of resistors and reactors connected to the circuit, and a transformer connected between the resistors and reactors and the indicating instrument to cause the instrument to be responsive to one phase-sequence component of the quantities of the circuit.

7. A device for measuring the amount of unbalance of a polyphase circuit comprising a single-phase measuring instrument, a transformer having two primary windings and one secondary winding, means for connecting the instrument across the secondary winding, and means having such characteristics and so connected between the circuit and the other windings that the instrument shall be actuated in accordance with one symmetrical component of a polyphase electrical quantity.

8. In a polyphase circuit, the combination with an electro-responsive device, of impedances having such characteristics and disposed to so connect the device to the circuit that the device will be actuated in accordance with one symmetrical component of an unbalanced polyphase electrical quantity traversing the circuit.

9. In an N-polyphase circuit, the combination with an electro-responsive device, of a winding connected to said device, and means for causing a magnetic flux to interlink the said winding only when a balanced polyphase quantity of predetermined phase sequence comprising elements angularly displaced by $\frac{360}{N}$ degrees exists in said circuit.

10. In a polyphase circuit, the combination with an electro-responsive device, of a winding connected across the terminals of the electro-responsive device, and means connected to the circuit for causing a magnetic flux to interlink with said winding only when a balanced polyphase quantity of predetermined phase sequence exists on said circuit.

In testimony whereof, I have hereunto subscribed my name this 9th day of February, 1920.

ROBERT D. EVANS.